United States Patent [19]
Brodie

[11] Patent Number: 5,692,647
[45] Date of Patent: Dec. 2, 1997

[54] SOLAR POWER SYSTEMS FOR SELF-CONTAINED FUELING STATIONS

[76] Inventor: Richard G. Brodie, 25657 N. 17th Ave., Phoenix, Ariz. 85027

[21] Appl. No.: 514,597

[22] Filed: Aug. 14, 1995

[51] Int. Cl.[6] ........................................ B67D 5/00
[52] U.S. Cl. ..................... 222/173; 136/291; 222/608; 222/192
[58] Field of Search ..................... 222/173, 608, 222/192; 137/234.6, 376; 136/291

[56] References Cited

U.S. PATENT DOCUMENTS

| | | | |
|---|---|---|---|
| 4,948,010 | 8/1990 | Wiggins | 222/67 X |
| 4,987,729 | 1/1991 | Paytas | 136/291 X |
| 5,114,046 | 5/1992 | Bryant | 222/173 X |
| 5,149,188 | 9/1992 | Robbins | 136/291 X |
| 5,400,924 | 3/1995 | Brodie | 222/173 X |

OTHER PUBLICATIONS

Washington Home, p. 5, "Solar Scoops", Nancy L. Ross May 26, 1994.

*Primary Examiner*—Kevin P. Shaver
*Attorney, Agent, or Firm*—Martin L. Stoneman

[57] ABSTRACT

This invention relates to solar power systems for self-contained fueling stations. More particularly, this invention concerns the attachment to and above such a fueling station of a post-mounted solar power system, including a solar array providing shade for a shielded box holding a battery and a power control system with a wireless-remote-controlled safety power cutoff system. Such post and solar power system may be folded down adjacent the fueling station, thus enabling easier transport of the fueling station. The safety power cutoff system includes a series of relay switches for disabling key-switch control of a fuel pump.

20 Claims, 3 Drawing Sheets

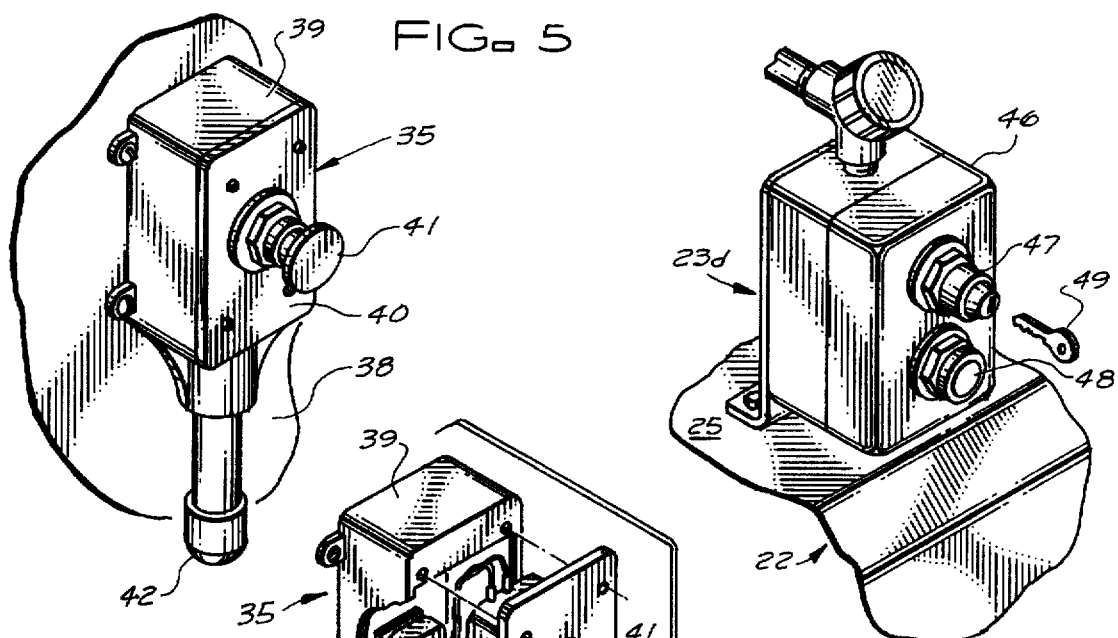
FIG. 5
FIG. 7
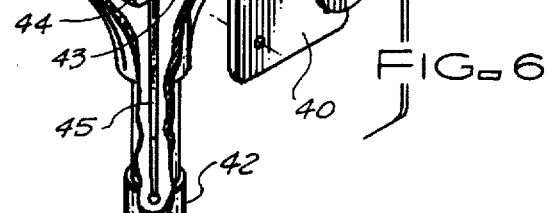
FIG. 6
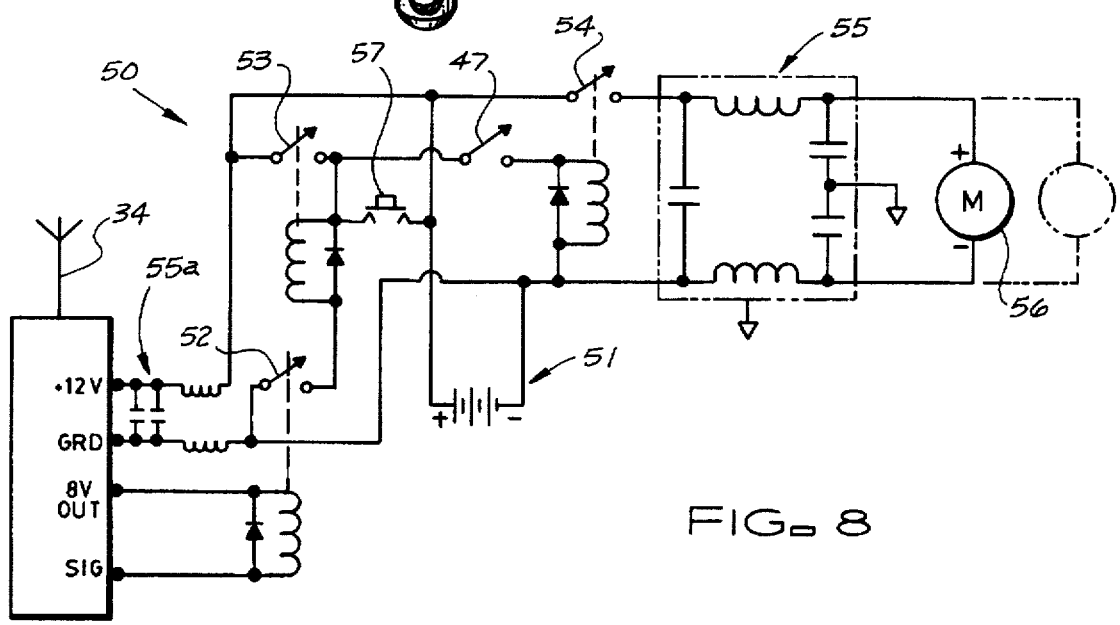
FIG. 8

1

SOLAR POWER SYSTEMS FOR SELF-CONTAINED FUELING STATIONS

BACKGROUND OF THE INVENTION

1. Field of the Invention

This invention relates to improved solar power systems for self-contained fueling stations. More particularly, this invention concerns the attachment to and above such a fueling station of a post-mounted solar power system, including a solar array providing shade for a shielded box holding a battery and a power control system with a wireless-remote-controlled safety power cutoff system. Such post and systems may be folded down adjacent the fueling station, thus enabling easier transport of the fueling station.

2. Description of the Background and Prior Art

Environmental concerns have prompted governmental re-appraisals of the underground storage of fuels and hydrocarbon products, which frequently leak into the earth, contaminating water supplies and doing other harm as well. All levels of government have issued and are continuing to issue strict guidelines for the operation, installation, and removal of underground fuel storage tanks. The costs for required cleanup of such an underground leak are frequently extremely expensive, even catastrophic.

Thus, there is nationwide interest in aboveground storage of such fuels. And there has been continuing development of self-contained and portable aboveground fueling stations having various storage, dispensing, and power systems. Frequently, such systems find immediate application for use in remote areas requiring, temporarily or permanently, a local fueling station; and the provision of power to operate fuel pumps, etc., is often more of a problem in remote areas than in utility-served areas. Thus, it is often important to try to eliminate the need for electrical service to the fueling station.

A clear and recent example of the prior art is applicant's recently issued U.S. Pat. No. 5,400,924 for an above-ground fuel tank system. Shown and described therein is a self-contained fueling station which may derive power from a roof-mounted solar array operating in conjunction with a battery at ground level. Also described therein is a general system for using a wireless signal from a wireless remote control device to turn off an emergency shut-off switch which turns off all electrical power to the fueling station.

Also, an example of a popular aboveground fueling system is the portable and self-contained ConVault (TM) product, generally including a steel fuel tank encased in a concrete vault with a fuel dispensing system (see U.S. Pat. Nos. 4,826,644, 4,931,235, 4,934,122, and 4,986,436). It would be highly beneficial if such self-contained or vaulted tanks could be provided with an efficient source system of portable electrical power, which source system was also safe to use and efficiently transportable with the aboveground fueling station.

OBJECTS OF THE INVENTION

A primary object of the present invention is the provision of an improved electrical power system for use in association with an aboveground fueling station. Another primary object of this invention is to provide an improved solar power system for use in association with an aboveground fueling station. In addition, it is an important object of this invention to provide such an improved solar power system which is also safe to use and efficiently transportable with the aboveground fueling station. Another important object is to provide such systems with an emergency power cutoff system which is safe, efficient, and may be remote-controlled. Further, it is an important object of the present invention to provide a means of constructing and mounting the improved solar power system in association with the aboveground fueling station so that it may be efficiently transported with the aboveground fueling station. Other objects of this invention will become apparent with reference to the following invention descriptions.

SUMMARY OF THE INVENTION

According to a preferred embodiment of the present invention, there is provided, in association with an aboveground fueling station of the type used in remote areas and comprising fuel pump means and fuel tank means within protective enclosure means, the improvement comprising, in combination, the following. Mounted adjacent an upper surface of such fueling station and extending upwardly above such protective enclosure means, there are post means. Supported above such protective enclosure means by such post means, there are solar power means. And such solar power means comprises: solar array means for generating electrical power; power control means for control of power of such fueling station; and below such solar array means and substantially shaded by such solar array means, box means for enclosing, supporting and shielding of such power control means.

The present invention additionally provides battery means, within such box means, for providing power to such fuel pump means and rechargeable by such generated electrical power from such solar array means. Also provided are antenna means connected to such power control means, wherein such power control means comprises power cutoff means operable by a signal from a wireless remote control device. In addition, the present invention is provided wherein such power cutoff means comprises: means for receiving such signal; first switch means, operable by such signal; and second switch means, controlled by such first switch means, for cutting off power from such battery means to such fuel pump means. Yet additionally, the present invention is provided wherein such power cutoff means further comprises third switch means, controlled by such second switch means, for cutting off power from such battery means to such fuel pump means. Further provided is key-switch means for controlling operation of such fuel pump means by controlling such third switch means when such third switch means is enabled by such second switch means, whereby operation of such key-switch means may be discontinued by such wireless remote control device. This invention also provides reset means, in association with such key-switch means, controlling reset of such second switch means.

The present invention, even further, provides, adjacent a lower portion of such post means and along such post means, first hinge means enabling transport of such fueling station with such post means in substantially horizontal position. And this invention also provides, adjacent an upper portion of such post means, second hinge means enabling transport of such fueling station with such solar array means in a substantially horizontal position. Yet additionally, the present invention is provided wherein such solar array means, such box means, such first hinge means, and such second hinge means are constructed and arranged to enable transport of such fueling station with such post means in horizontal position, with such solar array means in a substantially horizontal position and above such post means, and with such box means below such post means.

According to yet another preferred embodiment of the present invention, there is provided, in association with an aboveground fueling station of the type used in remote areas and comprising fuel pump means and fuel tank means within protective enclosure means, the improvement comprising, in combination: mounted adjacent an upper surface of such fueling station and extending upwardly from such protective enclosure means, post means; supported above such protective enclosure means by such post means, solar power means; and, adjacent a lower portion of such post means and along such post means, first hinge means enabling transport of such fueling station with such post means in horizontal position.

Further, according to this embodiment of the present invention, such improvement is provided wherein such solar power means comprises: solar array means for generating electrical power; power control means for control of power of such fueling station; and below such solar array means, box means for enclosing, supporting and shielding of such power control means. There is further provided, adjacent an upper portion of such post means, second hinge means enabling transport of such fueling station with such solar array means in a substantially horizontal position. Further provided is such invention wherein such solar array means, such first hinge means, and such second hinge means are constructed and arranged to enable transport of such fueling station with such post means in horizontal position, with such solar array means in a substantially horizontal position and above such post means, and with such box means below such post means. Even further provided by this invention are antenna means connected to such power control means, wherein such power control means comprises power cutoff means operable by a signal from a wireless remote control device.

Even additionally, according to a preferred embodiment of this invention, there is provided, in association with an aboveground fueling station of the type used in remote areas and comprising fuel pump means and fuel tank means within a protective enclosure, the improvement comprising, in combination: mounted to such fueling station and extending upwardly from such protective enclosure, a post; a solar array mounted on such post; a steel box mounted on such post below such solar array and substantially shaded by such solar array; and, enclosed in and supported by such box, a battery for providing power for such fueling station and rechargeable by electrical power from such solar array, and power control means for control of power of such fueling station.

According to this preferred embodiment, this invention further provides an antenna connected to such power control means, wherein such power control means comprises power cutoff means operable by a signal from a wireless remote control device. Additionally, this invention is provided wherein such power cutoff means comprises: a first relay controlled by such signal to open; a second relay energized/closed through such first relay and opening to cut off power from such battery to such fuel pump means when such first relay is opened; and a third relay energized/closed through such second relay and opening to cut off power from such battery means to such fuel pump means when such second relay is opened.

Also, according to this preferred embodiment, this invention provides a key-switch for controlling operation of such fuel pump means by controlling such third relay when such third relay is energized/closed by such second relay, whereby operability of such key-switch may be discontinued by control of such signal from such wireless remote control device. Also provided is reset means, in association with such key-switch means, controlling reset of such second relay, whereby, when such key-switch has been rendered inoperable, such key-switch may be again rendered operable only by activation of such reset means.

BRIEF DESCRIPTION OF THE DRAWINGS

FIG. 5 is a close-up perspective view illustrating the remote control means of a preferred embodiment of the present invention, shown mounted to a partially-shown support.

FIG. 6 is an exploded view, partially in section, of the remote control means of FIG. 5.

FIG. 7 is a close-up perspective view illustrating the key-switch and reset button (set in a housing) of the preferred embodiment of FIG. 1.

FIG. 8 is a circuit diagram of the power control means of a preferred embodiment of the present invention.

DETAILED DESCRIPTION OF A PREFERRED EMBODIMENT AND THE BEST MODE OF PRACTICE

Figure 1:
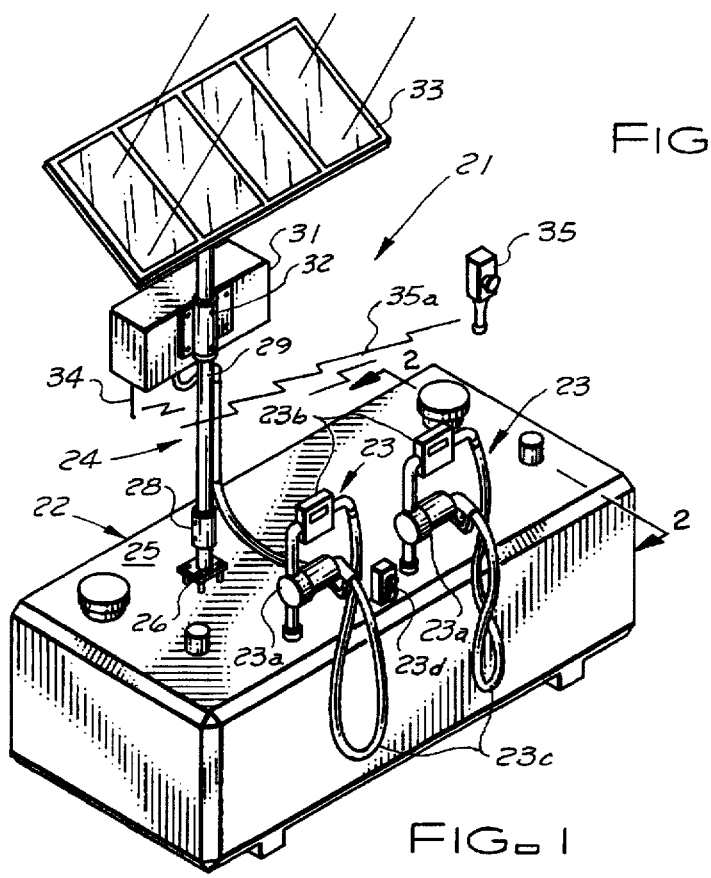
FIG. 1 is a perspective view illustrating pictorially an aboveground fueling station, improved according to a preferred embodiment of the present invention and in working position.
Figure 2:
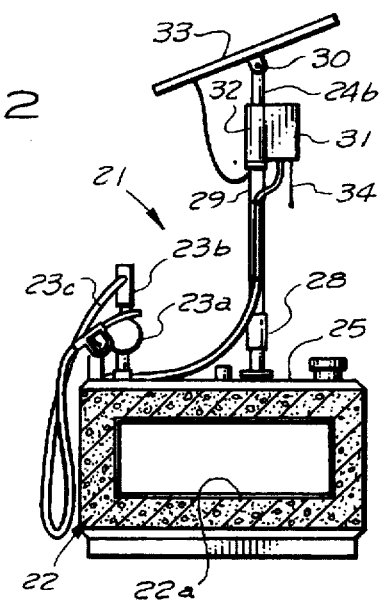
FIG. 2 is a right side view, partially in section through the section 2—2 of FIG. 1, of the fueling station of FIG. 1.

FIGS. 1 and 2 illustrate an aboveground fueling station 21 of the type used in remote areas and containing fuel tank means 22a (shown in section in FIG. 2) within protective enclosure means 22 (such as the illustrated concrete vault), improved according to a preferred embodiment of the present invention and in working position. Fuel-dispensing means 23, including fuel pump means 23a, fuel meter means 23b, fuel dispensing line 23c, and key-switch/reset box 23d, are shown extending from protective enclosure means 22.

Post means 24, mounted on an upper surface 25 of protective enclosure means 22, includes, at the lower end 24a of post means 24, bolt mounting 26 for such bolting/mounting of post means 24 to such upper surface 25 of protective enclosure means 22. Post means 24 also includes first hinge 27 (not shown in FIG. 1), sleeve 28 (covering first hinge 27 when fueling station 21 is in working position), post 29, and second hinge 30 (not shown in FIG. 1). Box means 31 is attached to post 29 by box mounting 32.

Solar array means 33 (for providing solar energy in well known ways) is attached to post 29 at second hinge 30 at the upper end 24b of post means 24. By adjusting second hinge 30 (which may include, in well known ways, a universal hinge or double hinge for maximum flexibility), the angle between solar array means 33 and post 29 may be adjusted. In FIGS. 1 and 2, this angle is shown appropriately set for solar array means 33 to receive maximum sunlight and to shade box means 31. Box means 31, as shown, preferably has a receiving antenna 34 extending downwardly therefrom for receiving wireless signals 35a from wireless remote control device 35.

Figure 4:
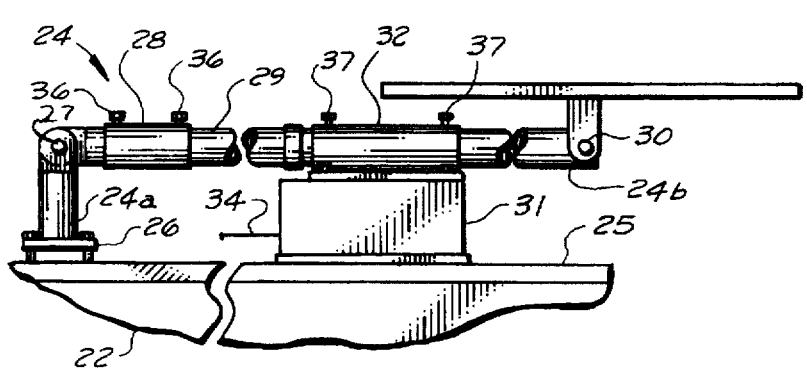
FIG. 4 is an expanded partial front view, partially in section, illustrating, for the embodiment of FIG. 1, the folding of the post means and solar power means in position for transport.
Figure 3:
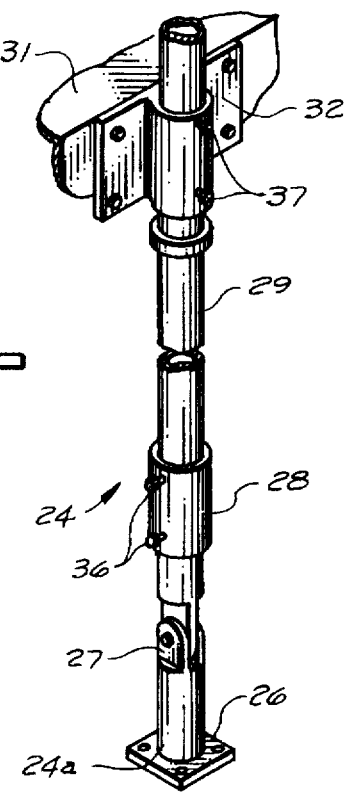
FIG. 3 is an expanded partial pictorial view (as in FIG. 1), partially in section, illustrating a preferred embodiment of the post means of the present invention, and showing the bottom hinge thereof.

As shown best in FIGS. 3 and 4, post means 24, when in its working position (as shown in FIG. 1), is held in substantially vertical position by moving sleeve 28 (from its position shown in FIG. 3) over first hinge 27 (into its position shown in FIG. 1), by loosening sleeve set screws 36, moving sleeve 28 into position over first hinge 27, and then tightening sleeve set screws 36. To place post means 24 into a substantially horizontal position to enable efficient transport of fueling station 21 (as by a bed of a truck, securely and without undue height), first hinge 27 is moved upward along post 29 to the position above first hinge 27 as shown in FIGS. 3 and 4. This permits post 29 to be swiveled about first hinge 27 to the horizontal position shown in FIG. 4. It is preferred, to enable most efficient transport of fueling station 21, that box means 31 be also moved, for transport, from its working position (as shown in FIG. 1) to its transport position beneath post 29 (as shown in FIG. 4) by loosening box mounting set screws 37 and then retightening box mounting set screws 37 when box means 31 has been properly placed. It is also preferred, to enable most efficient transport of fueling station 21, that solar array means 33 be also moved, for transport, from its working position (as shown in FIGS. 1 and 2) to its horizontal transport position above post 29 (as shown in FIG. 4), by swiveling solar array means about second hinge 30 (or, as mentioned, a well-known alternative such as a universal hinge or double hinge).

As will be described in detail in connection with the discussion of FIGS. 8 and 9 hereinafter, box means 31 encloses, supports, and shields the power control means 50 for fueling station 21, and also encloses, supports, and shields the battery means 51 for fueling station 21. It is preferred that these contents of box means 31 be maintained at appropriate cool temperatures; and it is thus preferred that, in adjusting the exact disposition of solar array means 33 into working position, and in adjusting the exact position of box means 31 in working position, that such dispositions be matched so that solar array means 33 provide as much shade as possible for box means 31, as exemplified in FIG. 1. It is noted that the solar power means of the present invention, supported above protective enclosure means 22 by post means 24, comprises solar array means 33, power control means 50, and box means 31 for enclosing, supporting, and shielding power control means 50, as well as battery means 51.

FIGS. 5 and 6 illustrate the wireless remote control device 35 of a preferred embodiment of the present invention, shown optionally mounted to a support means 38. Generally, safety regulations for fueling stations demand that there be remotely-operable emergency power cutoff control. Typically today, even for remote self-contained fueling stations, the station installation demands the digging of a trench for several hundred feet for the laying of appropriate wires from the fueling station to an emergency cutoff switch or button. By using the wireless remote control device 35 of the present invention for emergency cutoff signalling, the expense and inconvenience of the mentioned trenching and wiring is eliminated.

The wireless remote control device 35 includes, externally, casing 39, face plate 40, cutoff button 41, and antenna cover cap 42. Internally, button-operated switch 43 lies between cutoff button 41 and signal generator 44; and, in well-known ways, signal generator 44 emits a signal 35a for wireless transmission by transmitter antenna 45. When cutoff button 41 is pushed, as in an emergency, button-operated switch 43 temporarily turns off signal generator 44 and, temporarily, no wireless signal 35a is transmitted by transmitter antenna 45. This creates a situation in which receiving antenna 34 temporarily receives no wireless signal 35a (further discussed hereinafter in connection with FIG. 8).

FIG. 7 illustrates more clearly the key-switch/reset box 23d of the preferred embodiment of FIG. 1. Externally, casing box 46 is attached as shown to protective enclosure means 22. Extending from casing box 46 is key-switch 47 and power reset button 48, located efficiently and safely adjacent key-switch 47. Key 49, as shown, will be available to those with authority to operate fuel dispensing means 23. Internally, the electrical operation and connections of key-switch 47 and reset button 48 are described in connection with FIG. 8.

Figure 9:
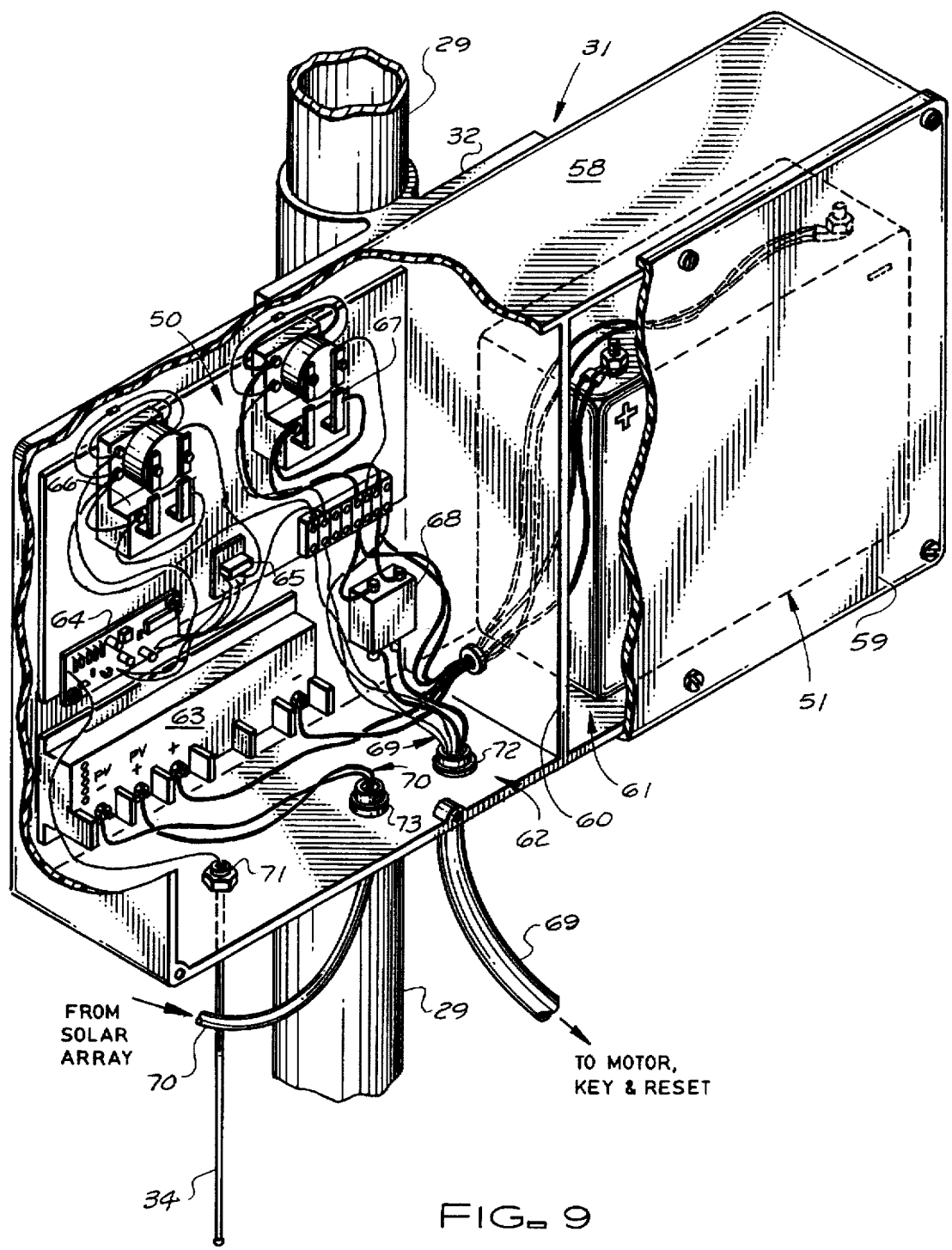
FIG. 9 is an expanded view, partially in section, of the box means, battery means, and power control means portions of the preferred embodiment of FIG. 1.

FIGS. 8 and 9 illustrate, respectively, a circuit diagram of the power control means 50 of a preferred embodiment of the present invention, and the physical arrangement of contents of the box means 31 of the preferred embodiment of FIG. 1, including battery means 51, and power control means 50 portions. With receiving antenna 34 normally receiving a continuous wireless signal 35a from wireless remote control device 35, small relay switch 52 (shown open, see FIG. 8) is, in well-known ways, maintained energized in a closed position. Thus, power relay switch 53 (shown open) is also normally, in well-known ways, maintained energized in a closed position. Thus, with the power then operative, when key-switch 47 (shown open) is turned to a closed position, key relay switch 54 (shown open) will become energized and be, in well-known ways, maintained energized in a closed position, thus permitting power to go (through low pass filter 55) to pump motor 56 of fuel pump means 23a, until key switch 47 is turned back to the "off" position, opening (in well-known ways) key relay switch 54 and removing power from pump motor 56. It is noted that battery means 51 may be used also for purposes other than herein described, for example to provide power to lights associated with fueling station 21; and, in all such cases, it is intended that When cutoff button 41 of wireless remote control device 35 is pushed, the wireless signal 35a to small relay switch 52 (see FIG. 8) is temporarily interrupted, thus small relay switch 52, being no longer energized, opens, thus, in well-known ways, removing power from power relay switch 53, which, being no longer energized, opens and disables key switch 47 from any further ability to produce energizing of key relay switch 54, thus effectively removing all possibility of power to pump motor 56. This emergency power cutoff (by use of the described emergency power cutoff means comprising small relay switch 52 and power relay switch 53) will continue until power relay switch 53 is reset (at 57 in FIG. 8) to be "energized"—by pushing reset button 48. It is expressly noted that, in making the power cutoff means of the present invention operable by a signal 35a from a wireless remote control device 35, the remote control device 35 may be designed to SEND a cutoff signal (rather than CEASE so sending as hereinabove described); and such cutoff signal may be used to interrupt the ground connection (at "SIG" in FIG. 8) of an energized small relay switch 52 in well known ways, as, for example, in many garage-door openers. A decision about which such operability method to use in a specific business instance will depend upon such things as battery requirements for remote device 35 for sending a continuous signal 35a, the requirements of any involved safety agency as to degree of "fail-safe" design permitted, etc.

With reference to FIG. 9, illustrating a preferred arrangement of the various contents of box means 31 and the connections of those contents with other physical parts of fueling station 21, box casing 58 is attached to box mounting 32, which, as has been described herein, is mounted to post 29. Box face plate 59 is removably attached, as shown, to box casing 58. Preferably, box casing 58 and box face plate 59 are made of steel to provide, in well-known ways, a good combination of strength and electrical shielding. Box divider 60 separates box means 31 into two adjoining spaces, battery space 61 and power control space 62. Box divider 60 contains therein divider aperture 60a to permit electrical connections between battery means 51 in battery space 61 and power control means 50 in power control space 62.

As shown, power control space 62 contains: photovoltaic charge controller means 63 for electrically controlling, in well known ways, power from solar array means 33; control parts 64 and 65 for equipping the electrical functions of low pass filter 55a (see FIG. 8) and small relay switch 52; power relay equipment 66 for equipping the electrical functions of power relay switch 53; key relay equipment 67 for equipping the electrical functions of key relay switch 54; and filter box 68 for equipping the electrical functions of low pass filter 55. Also, as shown, electrical connections 69 from power control means 50 to motor 56, key-switch 47, and reset button 48 pass through box casing 58 at box casing aperture 72; and electrical connections 70 from photovoltaic charge controller 63 to solar array means 33 passthrough box casing 58 at box casing aperture 73. Also, as shown, antenna mounting 71 in box casing 58 provides for the signal from receiving antenna 34 to pass through box casing 58 to power control means 50.

All of the described contents of box casing 58 may be mounted therein in by screws or in other manners well known to those skilled in the art. Depending upon the fuel pump means, pump operating amperes, and other settable electrical criteria, those skilled in the art will have no difficulty determining, in well known ways, the specific component selection and values for all of the parts of the circuit illustrated in FIG. 8.

Although applicant has described applicant's preferred embodiments of this invention, it will be understood that the broadest scope of this invention includes such modifications as diverse shapes and sizes and materials. Such scope is limited only by the below claims as read in connection with the above specification.

Further, many other advantages of applicant's invention will be apparent to those skilled in the art from the above descriptions and the below claims.

What is claimed is:

1. In association with an aboveground fueling station of the type used in remote areas and comprising fuel pump means and fuel tank means within protective enclosure means, the improvement comprising, in combination:
   a. mounted adjacent an upper surface of said fueling station and extending upwardly above said protective enclosure means, post means; and
   b. supported above said protective enclosure means by said post means, solar power means;
   c. wherein said solar power means comprises
      i. solar array means for generating electrical power;
      ii. power control means for control of power of said fueling station; and
      iii. below said solar array means and substantially shaded by said solar array means, box means for enclosing, supporting and shielding of said power control means.

2. The improvement of claim 1 further comprising, within said box means, battery means, rechargeable by said generated electrical power from said solar array means, for providing power to said fuel pump means.

3. The improvement of claim 2 further comprising
   a. antenna means connected to said power control means,
   b. wherein said power control means comprises power cutoff means operable by a signal from a wireless remote control device.

4. The improvement of claim 3 wherein said power cutoff means comprises:
   a. means for receiving said signal;
   b. first switch means, operable by said signal;
   c. second switch means, controlled by said first switch means, for cutting off power from said battery means to said fuel pump means.

5. The improvement of claim 4 wherein said power cutoff means further comprises:
   a. third switch means, controlled by said second switch means, for cutting off power from said battery means to said fuel pump means.

6. The improvement of claim 5 further comprising key-switch means for controlling operation of said fuel pump means by controlling said third switch means when said third switch means is enabled by said second switch means, whereby operation of said key-switch means may be discontinued by said wireless remote control device.

7. The improvement of claim 6 further comprising reset means, in association with said key-switch means, controlling reset of said second switch means.

8. The improvement of claim 7 further comprising:
   a. adjacent a lower portion of said post means and along said post means, first hinge means enabling transport of said fueling station with said post means in substantially horizontal position.

9. The improvement of claim 8 further comprising:
   a. adjacent an upper portion of said post means, second hinge means enabling transport of said fueling station with said solar array means in a substantially horizontal position.

10. The improvement of claim 9 wherein said solar array means, said box means, said first hinge means, and said second hinge means are constructed and arranged to enable transport of said fueling station with said post means in horizontal position, with said solar array means in a substantially horizontal position and above said post means, and with said box means below said post means.

11. In association with an aboveground fueling station of the type used in remote areas and comprising fuel pump means and fuel tank means within protective enclosure means, the improvement comprising, in combination:
   a. mounted adjacent an upper surface of said fueling station and extending upwardly from said protective enclosure means, post means;
   b. supported above said protective enclosure means by said post means, solar power means; and
   c. adjacent a lower portion of said post means and along said post means, first hinge means enabling transport of said fueling station with said post means in horizontal position.

12. The improvement of claim 11 wherein said solar power means comprises a. solar array means for generating electrical power;

b. power control means for control of power of said fueling station; and c. below said solar array means, box means for enclosing, supporting and shielding of said power control means.

13. The improvement of claim 12 further comprising:

a. adjacent an upper portion of said post means, second hinge means enabling transport of said fueling station with said solar array means in a substantially horizontal position.

14. The improvement of claim 13 wherein said solar array means, said box means, said first hinge means, and said second hinge means are constructed and arranged to enable transport of said fueling station with said post means in horizontal position, with said solar array means in a substantially horizontal position and above said post means, and with said box means below said post means.

15. The improvement of claim 14 further comprising a. antenna means connected to said power control means, b. wherein said power control means comprises power cutoff means operable by a signal from a wireless remote control device.

16. In association with an aboveground fueling station of the type used in remote areas and comprising fuel pump means and fuel tank means within a protective enclosure, the improvement comprising, in combination:

a. mounted to said fueling station and extending upwardly from said protective enclosure, a post;

b. a solar array mounted on said post;

c. a steel box mounted on said post below said solar array and substantially shaded by said solar array; and d. enclosed in and supported by said box, i. a battery for providing power for said fueling station and rechargeable by electrical power from said solar array, and ii. power control means for control of power of said fueling station.

17. The improvement of claim 16 further comprising:

a. an antenna connected to said power control means, b. wherein said power control means comprises power cutoff means operable by a signal from a wireless remote control device.

18. The improvement of claim 17 wherein said power cutoff means comprises:

a. a first relay controllable by said signal from said wireless remote control device;

b. a second relay energized/closed through said first relay and opening to cut off power from said battery to said fuel pump means when said first relay is opened; and c. a third relay energized/closed through said second relay and opening to cut off power from said battery means to said fuel pump means when said second relay is opened.

19. The improvement of claim 18 further comprising a key-switch for controlling operation of said fuel pump means by controlling said third relay when said third relay is energized/closed by said second relay, whereby operability of said key-switch may be discontinued by control of said signal from said wireless remote control device.

20. The improvement of claim 19 further comprising reset means, in association with said key-switch means, controlling reset of said second relay, whereby, when said key-switch has been rendered inoperable, said key-switch may be again rendered operable only by activation of said reset means.

* * * * *